US009410660B2

(12) United States Patent
Zimmerman

(10) Patent No.: US 9,410,660 B2
(45) Date of Patent: Aug. 9, 2016

(54) DECORATABLE UTILITY ROD ASSEMBLIES

(71) Applicant: Nifty Nob, Inc., Boulder, CO (US)

(72) Inventor: Susan C. Zimmerman, Niwot, CO (US)

(73) Assignee: NIFTY NOB, INC., Boulder, CO (US)

(*) Notice: Subject to any disclaimer, the term of this patent is extended or adjusted under 35 U.S.C. 154(b) by 15 days.

(21) Appl. No.: 14/175,877

(22) Filed: Feb. 7, 2014

(65) Prior Publication Data

US 2014/0151519 A1 Jun. 5, 2014

Related U.S. Application Data

(60) Continuation of application No. 13/028,891, filed on Feb. 16, 2011, now Pat. No. 8,671,545, which is a continuation-in-part of application No. 12/449,262, filed on Mar. 8, 2010, now Pat. No. 8,911,996, which is a continuation of application No. 12/018,674, filed on Jan. 23, 2008, now Pat. No. 7,571,532, which is a division of application No. 11/237,532, filed on Sep. 28, 2005, now abandoned.

(51) Int. Cl.
*A47H 1/142* (2006.01)
*A47K 10/10* (2006.01)
*A47G 25/06* (2006.01)
(Continued)

(52) U.S. Cl.
CPC ........... *F16M 13/02* (2013.01); *A47G 25/0635* (2013.01); *A47H 1/142* (2013.01); *A47K 10/10* (2013.01); *A47H 2023/003* (2013.01); *A47K 2201/02* (2013.01); *Y10T 29/49947* (2015.01); *Y10T 29/49963* (2015.01)

(58) Field of Classification Search
CPC .............. A47G 25/0635; A47H 1/142; A47H 2023/003; A47K 10/10; A47K 2201/02

USPC .............. 211/88.04, 105.1, 105.2, 105.3, 123
See application file for complete search history.

(56) References Cited

U.S. PATENT DOCUMENTS 1,097,496 A * 5/1914 Woodhead ............. A47K 10/10
 211/123
1,276,463 A * 8/1918 Wells .......................... 211/123
(Continued)

FOREIGN PATENT DOCUMENTS

CA  2396150 A1 * 2/2003 ............... A47H 1/10
FR  994776 A  * 11/1951 ............. A47K 10/10
FR  2538054 A1 * 6/1984 ......... A47G 25/0635

OTHER PUBLICATIONS

File History of related U.S. Appl. No. 11/237,532 as of Jan. 23, 2008.
(Continued)

*Primary Examiner* — Joshua Rodden
(74) *Attorney, Agent, or Firm* — Lathrop & Gage LLP

(57) ABSTRACT

One customizable utility rod assembly includes a wall attachment member; a base rod; and a cross rod, hook, towel ring, shelving rod, or toilet paper rod extending from the base rod. The wall attachment member has threading and at least one hole. The base rod has a distal side and a threaded proximal side threadably coupling the base rod to the wall attachment member. A method of customizing a utility rod having: (a) a threaded wall attachment member with a hole, and (b) a base rod presenting a distal side and a threaded proximal side forming a cavity, includes the following steps. Step (1): securing the wall attachment member to a surface with a fastener extending through the hole. Step (2): threadably coupling the base rod proximal side to the wall attachment member such that the wall attachment member is at least partially enclosed within the cavity.

6 Claims, 18 Drawing Sheets

(51) Int. Cl.
*F16M 13/02* (2006.01)
*A47H 23/00* (2006.01)

(56) References Cited

U.S. PATENT DOCUMENTS

| | | | | |
|---|---|---|---|---|
| 1,962,739 A * | 6/1934 | Hoegger | ............... | A47K 10/10 248/222.14 |
| 2,199,851 A | 5/1940 | Culver | | |
| 2,443,343 A * | 6/1948 | Crocker | ............... | A47K 10/10 248/251 |
| 2,473,771 A * | 6/1949 | Slater | ............... | A47K 10/04 211/104 |
| 2,542,941 A * | 2/1951 | Post | ............... | A47K 10/10 211/123 |
| 4,385,248 A | 5/1983 | Laskaris | | |
| 4,829,632 A | 5/1989 | Frier et al. | | |
| 4,907,771 A * | 3/1990 | Wang | ............... | A47G 25/06 248/222.14 |
| 4,979,713 A | 12/1990 | Bell | | |
| 4,998,701 A * | 3/1991 | Rawald | ............... | A47G 25/0635 248/205.1 |
| 5,026,013 A | 6/1991 | Robbins | | |
| 5,071,099 A * | 12/1991 | Kuo | ............... | A47K 10/10 248/224.7 |
| 5,385,248 A | 1/1995 | Klein, Jr. | | |
| 5,813,636 A | 9/1998 | Lollis | | |
| 5,875,903 A | 3/1999 | Chen | | |
| 6,019,233 A | 2/2000 | Yu | | |
| 6,220,460 B1 * | 4/2001 | Pan | ............... | A47K 10/10 211/105.1 |
| 6,276,648 B1 | 8/2001 | Katz et al. | | |
| 6,371,423 B1 | 4/2002 | Miller | | |
| 6,578,809 B1 | 6/2003 | Dimella | | |
| 6,651,830 B2 | 11/2003 | Pan | | |
| 6,719,156 B2 | 4/2004 | Ellbogen et al. | | |
| 6,817,044 B1 | 11/2004 | Ouyoung | | |
| 6,832,445 B2 | 12/2004 | Pitzen | | |
| 7,367,535 B2 | 5/2008 | Lai | | |
| 7,571,532 B2 | 8/2009 | Zimmerman | | |
| 7,900,334 B2 | 3/2011 | Zimmerman | | |
| 7,997,428 B2 * | 8/2011 | Goldstein | ............... | A47H 1/022 16/87 R |
| 8,132,766 B2 * | 3/2012 | Tooley | ............... | A47K 5/18 248/205.5 |
| 8,641,000 B1 * | 2/2014 | Eide | ............... | A47K 10/12 206/322 |
| 2006/0043039 A1 * | 3/2006 | Garrett | ............... | A47K 10/04 211/105.1 |
| 2008/0184475 A1 * | 8/2008 | Sladick | ............... | A47K 17/022 4/576.1 |
| 2011/0174948 A1 * | 7/2011 | Ward | ............... | A47H 1/142 248/265 |
| 2011/0297632 A1 * | 12/2011 | Goldstein | ............... | A47H 1/022 211/105.6 |

OTHER PUBLICATIONS

Notice of Allowance from related U.S. Appl. No. 12/018,674, as of Apr. 3, 2009, 9 pages.
Select File History of related U.S. Appl. No. 12/499,262 from Aug. 23, 2010 through Nov. 2, 2010, 26 pages.
Select File History of related U.S. Appl. No. 13/028,891 from May 24, 2013 through Oct. 30, 2013, 40 pages.

* cited by examiner

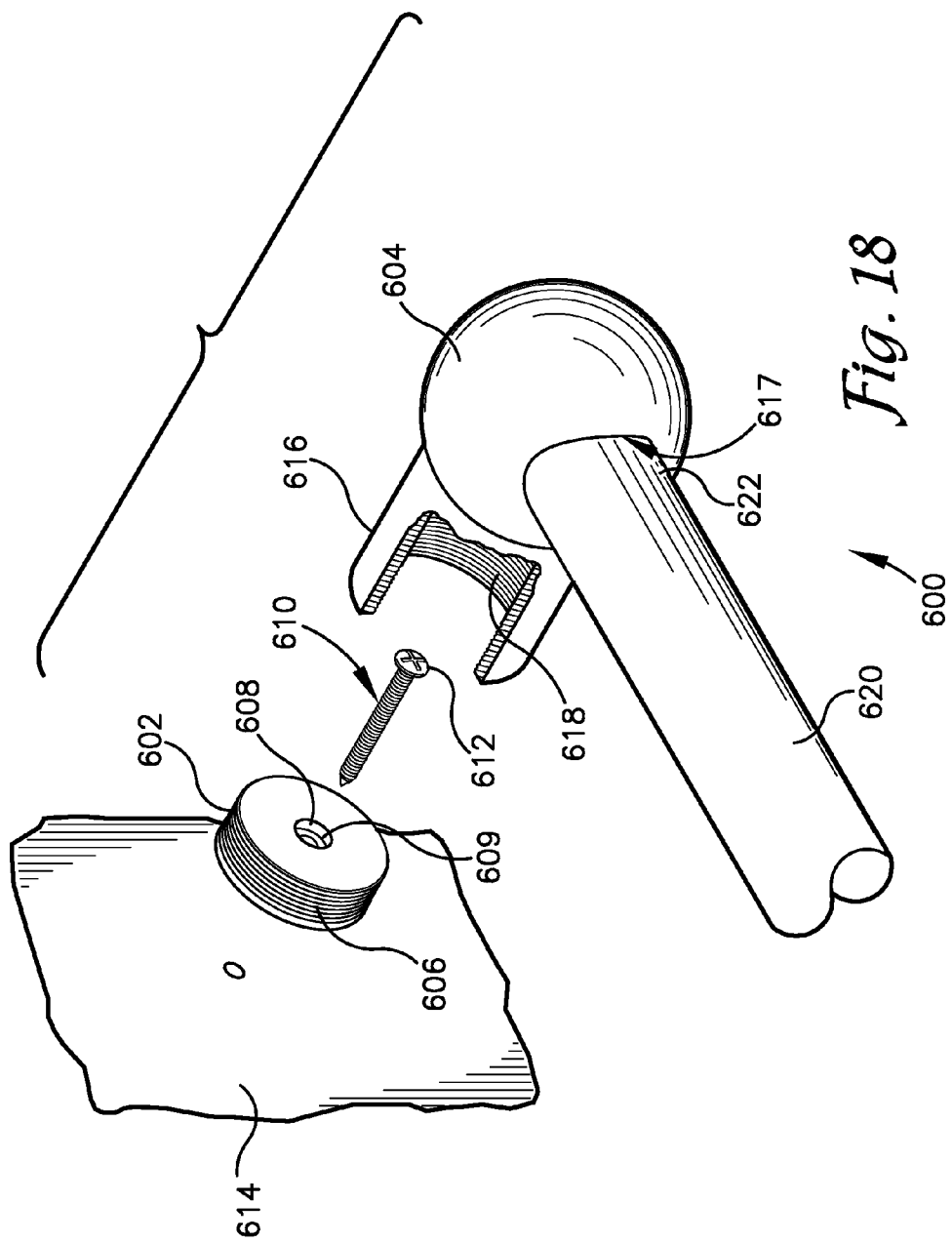

DECORATABLE UTILITY ROD ASSEMBLIES

RELATED APPLICATIONS

This application is a continuation of U.S. patent application Ser. No. 13/028,891, filed Feb. 16, 2011, which is a continuation-in-part of U.S. patent application Ser. No. 12/499,262, filed Jul. 8, 2009, now U.S. Pat. No. 7,900,334, which is a continuation of U.S. patent application Ser. No. 12/018,674, filed Jan. 23, 2008, now U.S. Pat. No. 7,571,532, which is a division of U.S. patent application Ser. No. 11/237,532 filed Sep. 28, 2005, now abandoned. Priority to each of these applications is claimed, and the disclosures of these applications are all incorporated herein by reference.

FIELD OF INVENTION

The field of the invention is utility rods and racks that attach to walls. Specifically, the invention relates utility rods the wall mounts of which may be decorated with covers of a variety of shapes that hide screws and other wall attachments and the ends of which may be decorated with knobs, medallions, and end pieces, all of which may be easily changed to match room décor and style, or to conform to a seasonal, interest, or vanity theme.

BACKGROUND OF INVENTION

It is common practice to provide utility rods with caps, plates, or other covers to hide the fasteners with which the rods and racks are attached to a wall or other support. Similarly, it is common to provide the ends of rods and racks with caps or plugs that cover the ends of the rods and racks so as to hide the hollow interiors of the rods and racks and cover the exposed, often sharp edges at the ends of the rods and racks.

Unfortunately, the plates, caps, and covers typically require additional structure and attachments such as set screws, clips, or the like. As a result, wall plates and covers frequently do not attach easily and may project or loosen from the wall or other mounting surface, because they must incorporate additional parts that permit the cover to be secured. If the covers, caps, or plates are not themselves firmly secured, they may detach under use, causing the towel bar or rack to fall from its mount, expose the wall attachment and fasteners, and/or cause the towel bar or rack to loosen and move about when being used. It is also frequently the case that the wall covers must have a shape that matches the wall mount.

Due to insecure attachments, end caps for rods and bars may also loosen and fall off, exposing the hollow interior of the rod or rack and the sharp, unattractive ends of the rods or racks.

In addition, such end caps, plates, caps, and covers are usually made of the same materials as are the rods and attachments—i.e., they are made to match the utility rod or rack and do not have the flexibility to easily accommodate different shapes or different designs and/or artwork that may better suit the décor of a room, the interests of the users of the rods or racks, or seasonal themes. And, many such end caps cannot be changed without removing the rod or rack from the wall.

For example, Bell U.S. Pat. No. 6,371,423 discloses a wall mount cover arrangement that includes an escutcheon, a backing plate, a stud, seals and grommet, and the resulting wall mount sticks out some distance from the wall. The end cap also includes an assembly of several parts including a head, a hub, a shank, and insert, a ring, and a threaded shank, which is secure, but not easily changed. No provision or suggestion is made for decorative cover plates, decorative end caps, or advertising indicia.

Katz et al. U.S. Pat. No. 6,276,648 includes a spacer that covers a threaded rod to attach the base to the mount, and a slot along the rear surface of the rod. A set screw is used to lock the towel bar in place. A cap covers the distal end of the towel bar. No provision or suggestion is made for decorative cover plates, decorative end caps, or advertising indicia.

Klein U.S. Pat. No. 5,385,248 shows a bulky wall attachment that encloses a set screw that is installed in an apparent separate wall mount. Additional set screws are mounted in the ends of the wall mount attachment to secure a cross rod to the wall mounts. No provision is made for changing decorative wall plates or rod end caps or for placing messages thereon.

SUMMARY OF INVENTION

The present invention features a simple wall mount that may be screwed to the wall or a stud. A base mount extends outward from the wall mount. The bottom portion of the base is threaded. A cover plate, which may be any shape and decorated in any fashion, has a threaded central hole that slides on and over the base mount or rod and is screwed to the threading bottom portion of the base. A hole in the side of the base rod accommodates the end of a cross rod. Alternatively, a hole entirely through the base may accommodate a ring to hold a towel or other object.

The exposed end of any rod is closed and provided with a threaded hole into which a set screw is threaded; the outward or exposed end of the set screw is covered with an end cap which has a threaded central hole that is screwed onto the exposed end of the set screw. The end cap may be of any shape and decorated in any fashion. The set screw at the end of the rod may also be screwed into a threaded hole near the end of a cross rod to secure the cross rod to the base rod.

The decorative wall or mount cover plate may be changed by simply unscrewing it from the end of the base rod near the wall or other mounting surface and replacing it with another end cap embodying a different shape or decoration. Similarly, the decorative end cap may be replaced by simply unscrewing it and replacing it with another end cap embodying a different shape or decoration.

The cover plates and end caps of the invention may also be made of materials that are different from the balance of the utility rod. Such materials may be metal, plastic, wood, stone, or any other material into which a threaded hole may be formed or added.

The cover plates and end caps may also be made of nearly any shape or surface configuration to suit the desires of the user. They may be made of three dimensional shapes or shapes having flat surfaces that may contain logos, an initials, seasonal indicia, artwork, advertising indicia, and combinations thereof.

BRIEF DESCRIPTION OF THE DRAWINGS

FIG. 18 is a perspective exploded view of yet another embodiment of a utility rod assembly.

DETAILED DESCRIPTION

Figure 1:
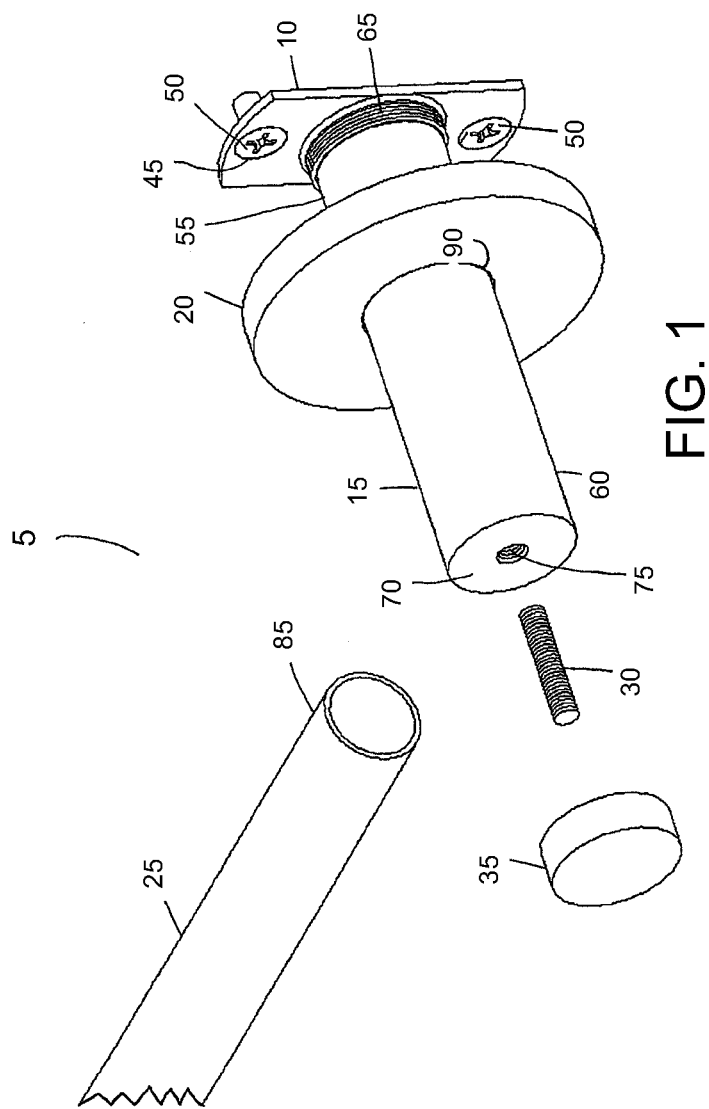
FIG. 1 is a perspective exploded view of a utility rod assembly of the invention.
Figure 2:
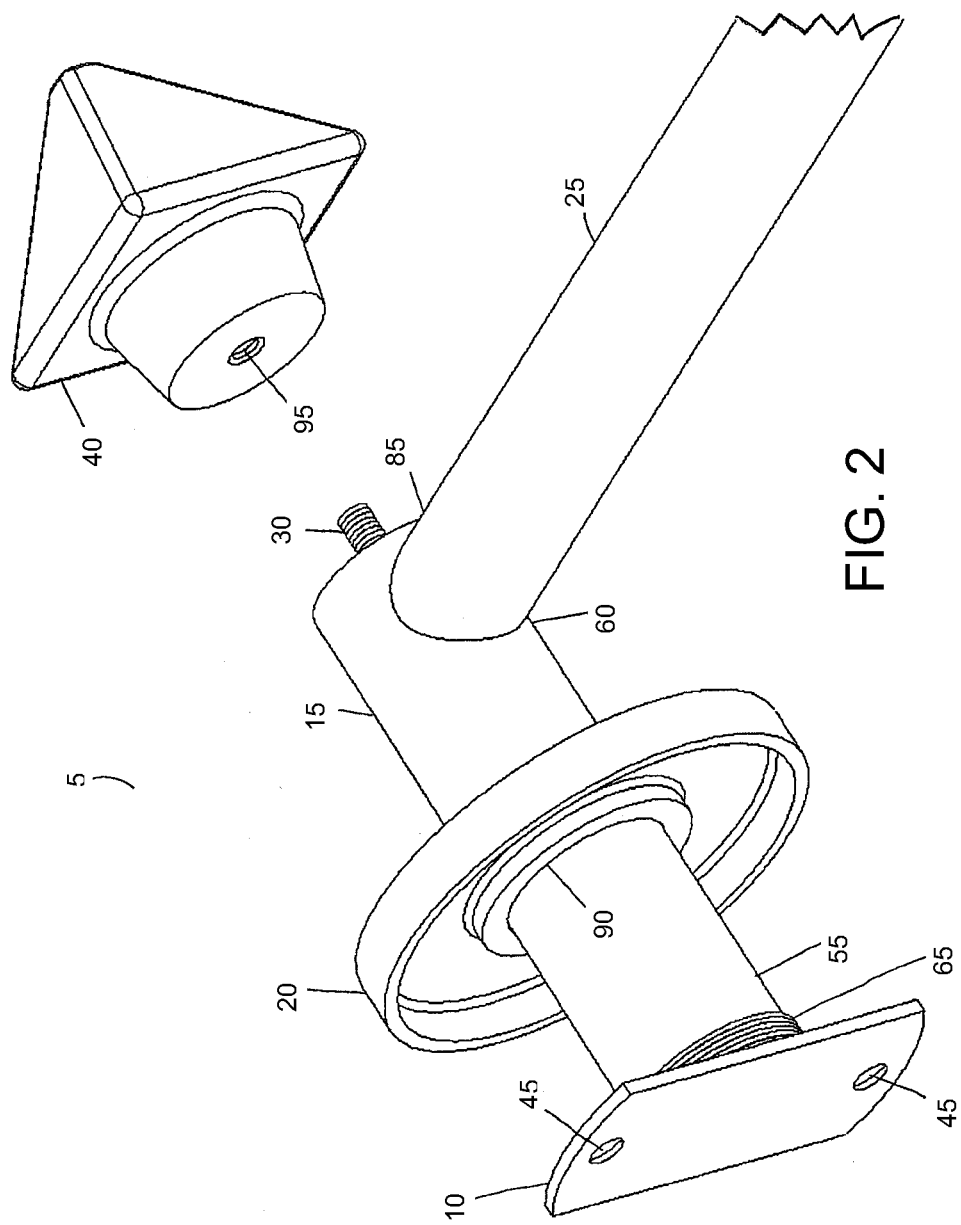
FIG. 2 is a perspective exploded view of a second embodiment of a rod assembly.

As shown in FIGS. 1 and 2, the utility rod assembly 5 comprises a wall attachment plate 10, a base rod 15, a cover plate 20, a cross rod 25, a set screw 30, and a knob or end cap 35. FIG. 2 shows the same basic parts, but has a knob or end cap 40 of a different style or shape.

As shown in FIG. 2, the wall attachment plate 10 contains holes 45 through which the base rod 15 may be secured to a wall or stud (not shown) by screws 50.

Figure 3:
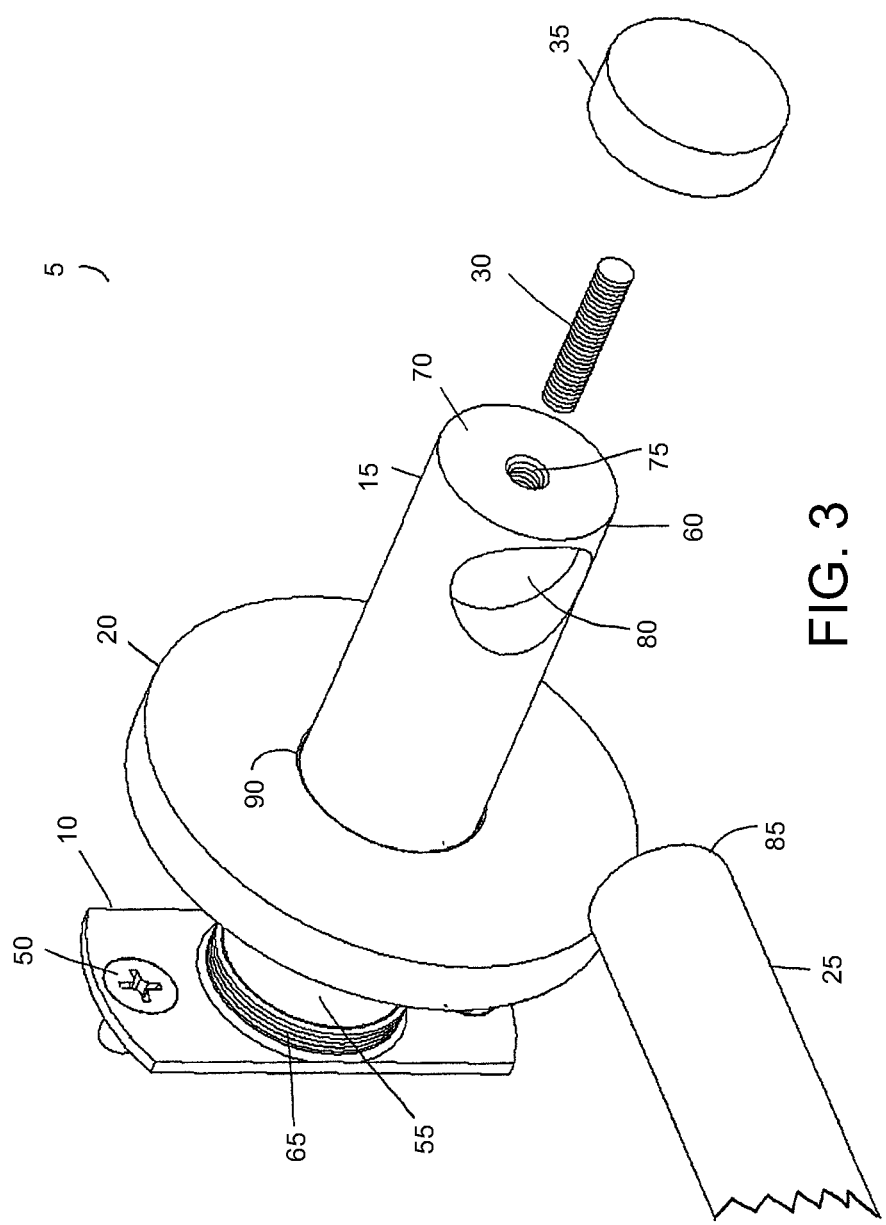
FIG. 3 is a perspective exploded view of the rod assembly from another perspective.
Figure 4:
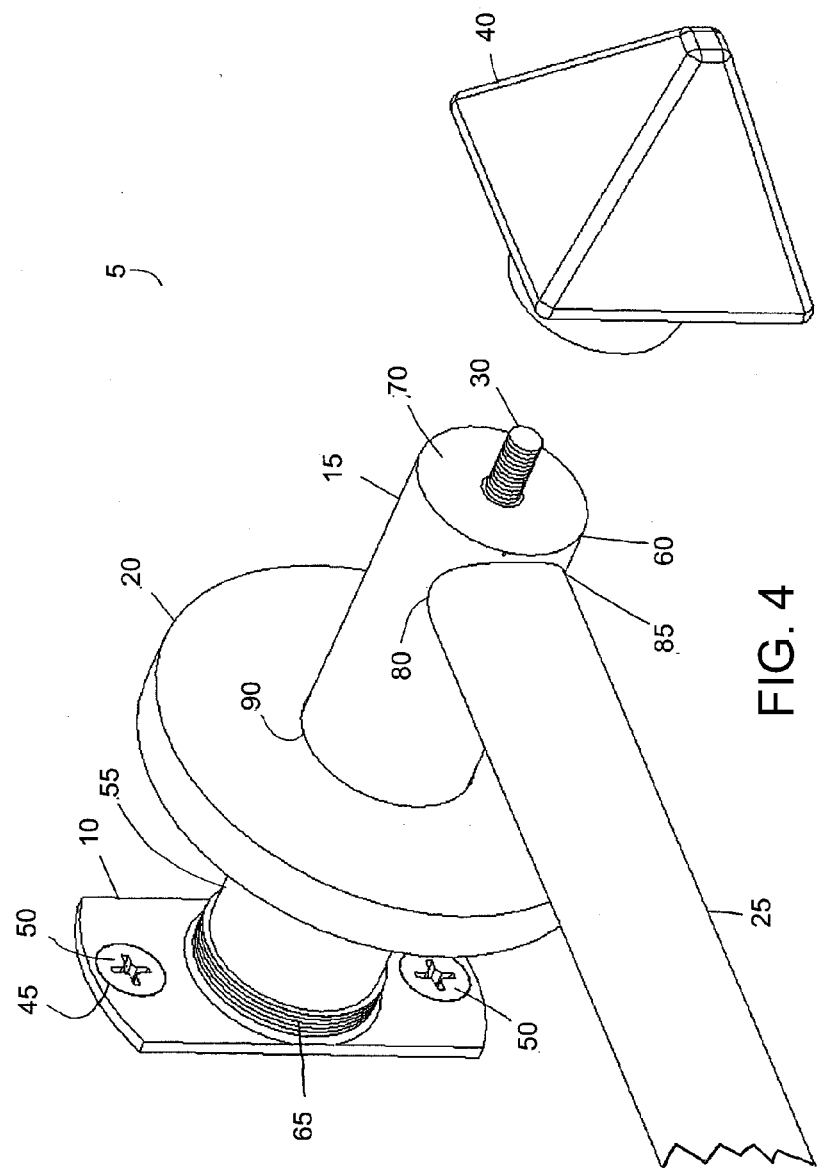
FIG. 4 is a perspective partially exploded view of the second embodiment from another perspective.
Figure 5:
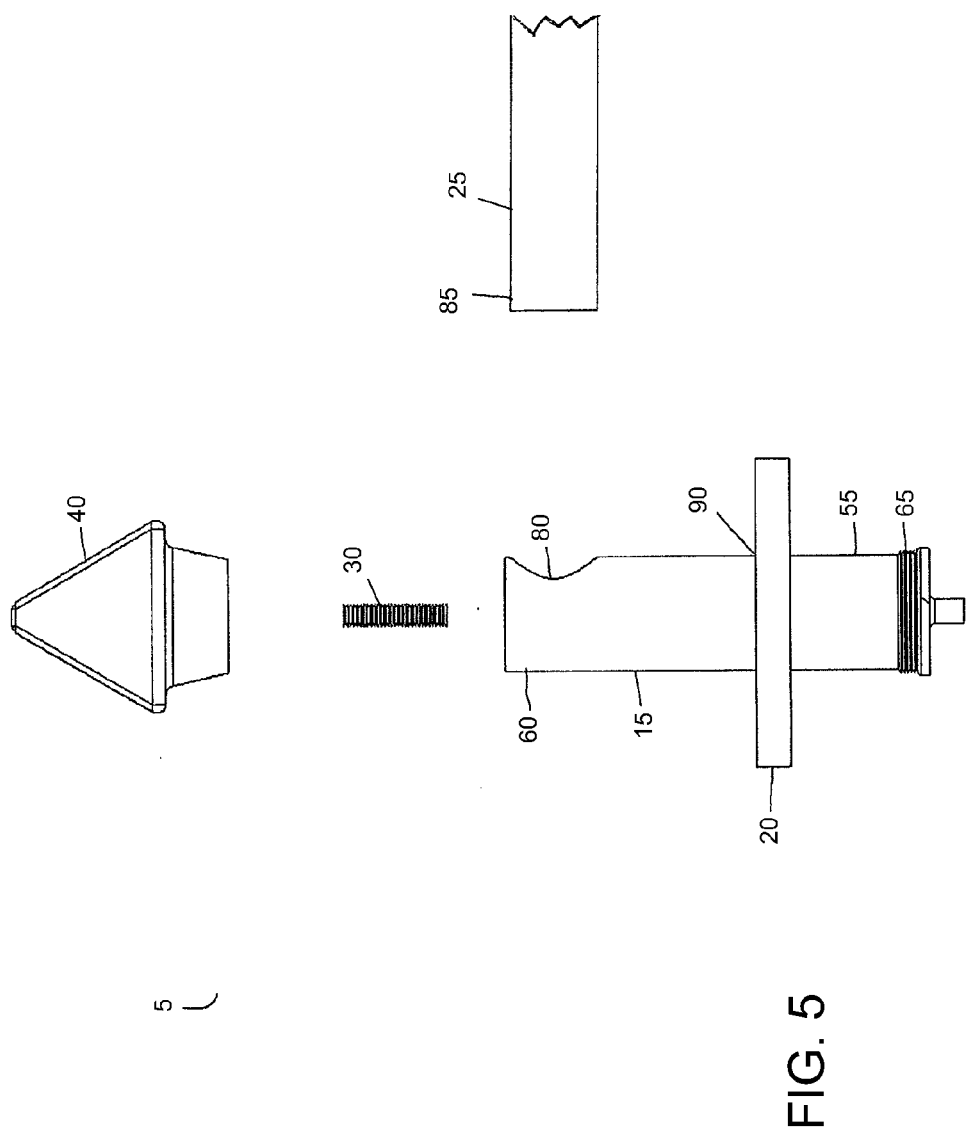
FIG. 5 is a top exploded view of the second embodiment.
Figure 6:
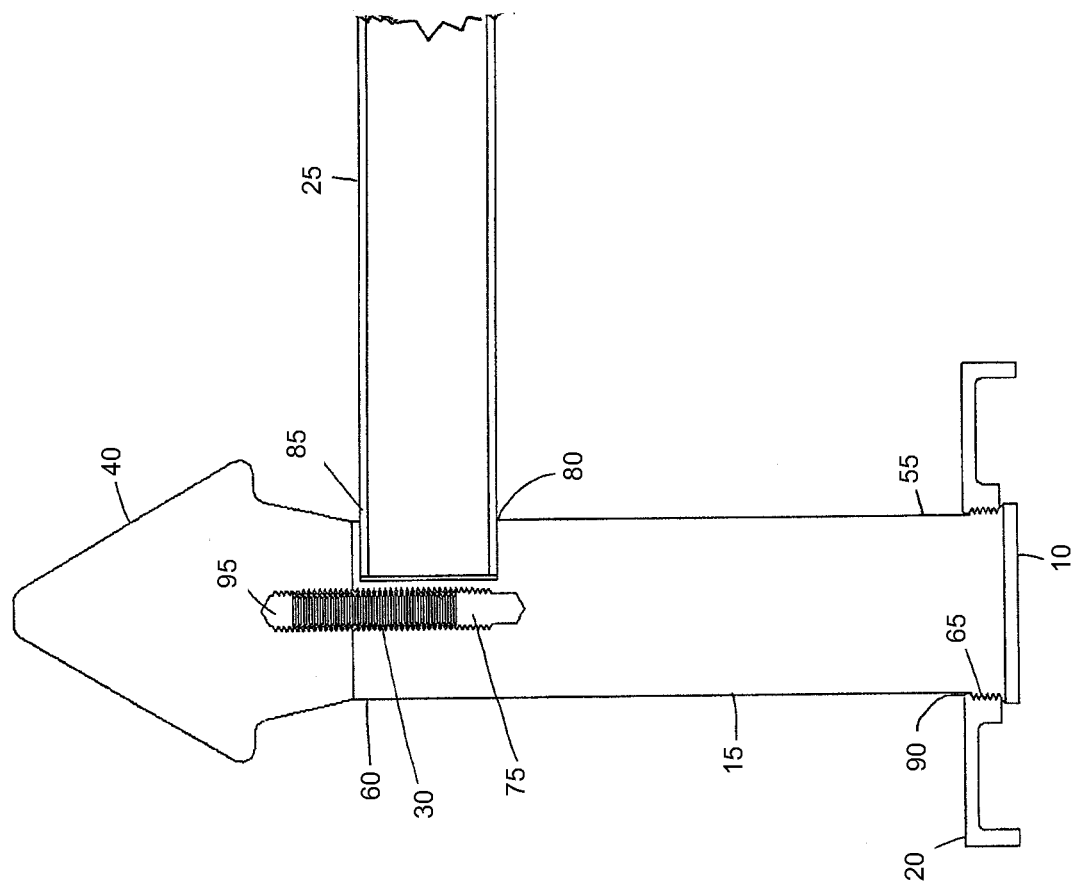
FIG. 6 is a top cross sectional view of the second embodiment.

The base rod 15 is incorporated in the attachment plate 10. As shown in FIGS. 1, 3, 4, 5 and 6, a proximal end 55 of the base rod 15 is slightly larger in diameter than the distal end 60 of the base rod 15. As shown in FIGS. 1, 3, and 6, the proximal end 55 of the base rod 15 is threaded, containing threads 65. The distal end 60 of the base rod 5 contains a solid end or plug 70, which forms a threaded hole 75. As shown in FIGS. 3, 5, and 6, the distal end 60 of the base rod 5 also contains a side hole 80 that is sized to receive an end 85 of the cross rod 25.

The cover plate 20 forms a central hole 90 that is threaded.

The set screw 30 is completely threaded; if desired half of the set screw may be threaded in the reverse direction from the other half.

As shown in FIGS. 2 and 6, end caps 35 and 40 each form a threaded hole 95. The set screw 30 is screwed about halfway into the plug or solid end 70 of the base rod 15, and the end cap 35 or 40 is screwed onto the half of the set screw 30 that remains outside of the plug or solid end 70 of the base rod 15.

Figure 7:
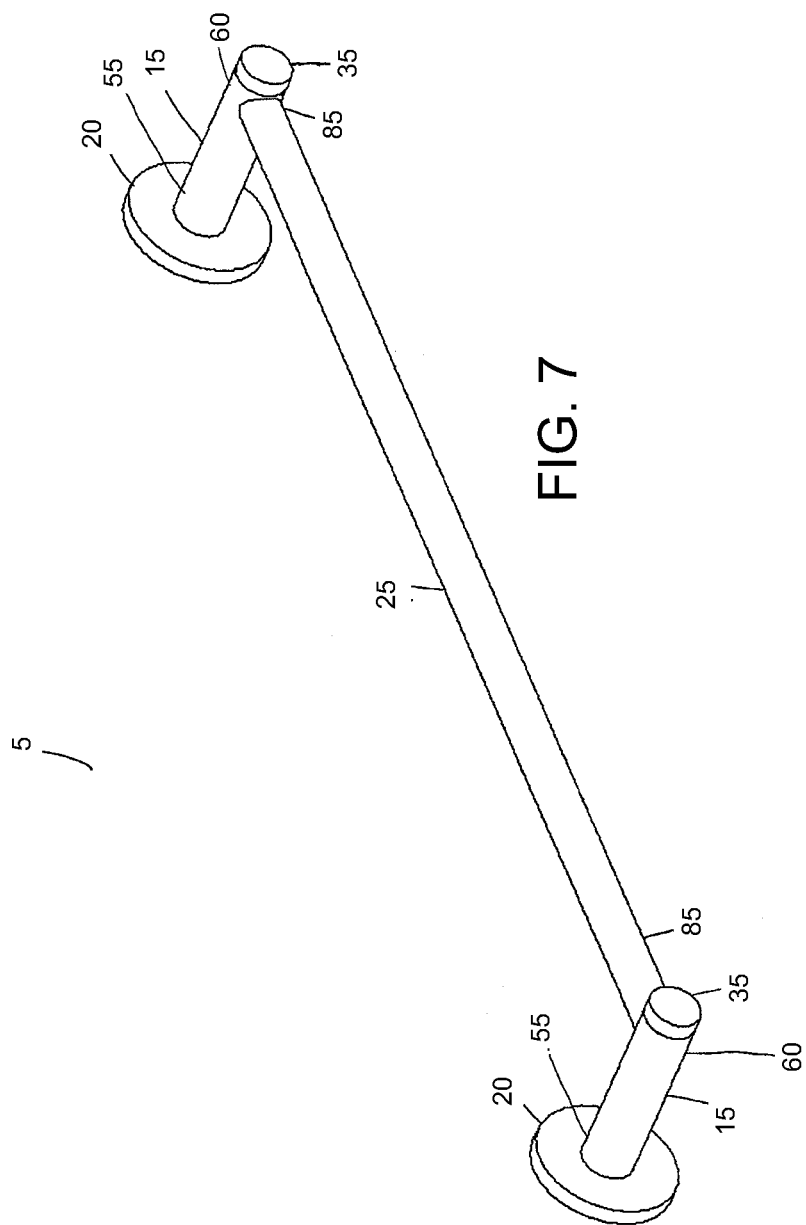
FIG. 7 is a perspective view of the fully assembled utility rod assembly attached to a wall or other surface (not shown)

A typical utility rod assembly is attached to the wall or support surface at two locations as shown in FIG. 7. Such a utility rod assembly would of course contain one cross rod 25, two wall attachment plates 10, two base rods 15, two cover plates 20, two set screws 30, and two end caps 35 or 40.

The rod assembly 5 is assembled by screwing the wall attachment plates 10 into a wall. The cover plates 20 are then placed over their respective base rods 15 and screwed down over the wall attachment plate 10 to hide the attachment plate 10 and its screws 50.

The cross rod 25 is then inserted into the side holes 80 of at the distal ends of the base rods 5. The set screws 30 are then threaded into the solid end or plugs 70 at the distal ends 60 of the base rods 15. The end caps 35 or 40 are then screwed onto the exposed ends of the set screws 30.

As will be appreciated from the above, the cover plates 20 are not limited to the round shape show in the drawings. Indeed, the cover plates 20 may be made of any shape that permits a threaded central hole 90 to be placed therein. Thus, the cover plates may be made in such varied shapes as squares, hexagons, footballs, flowers, Thanksgiving turkeys, cartoon characters, or any other desirable shape. Alternatively, the cover plates 20 may be circular or rectangular and contain painted or raised scenes or decorations.

As will also be appreciated from the above, the end caps 35 or 40 are similarly not limited to the shapes shown in the drawings. They, too, may be made in such varied shapes as flowers, initials, animals, logos, cartoon characters, gems, or other objects.

Indeed, neither the cover plates 20 nor the end caps 35 or 40 need be made of the same material as the other parts of the utility rod assembly 5. They may be made of any material into which a threaded hole such as 90 or 95 may be formed. Thus, the end caps and cover plates may be made of metal, wood, plastic, stone, or other substances which add to the theme, vanity, décor, or style desired by the user. The end caps and cover plates may also be made of a material such as metal or wood with a veneer of another material that may be painted or otherwise formed or decorated by the user.

Further, the end caps 35 or 40 and cover plate 20 may present a shape or surface configuration that is round, oval, square, octagonal, rectangular, triangular, octagonal, pentagonal, quadrilateral, any combination of the forgoing, or any other shape that permits a threaded hole to be formed therein.

The utility rod assembly 5 thus has maximum flexibility to suite the tastes of the users, allowing for different themes, styles, artwork, or seasonal expressions. Thus, the cover plate 20 or end caps 35 or 40 may contain paintings, drawings, messages, Christmas decorations, Independence Day decorations, flags, Thanksgiving decorations, logos, shields, medallions, or advertising indicia. In commercial establishments, the cover plate 20 and end caps 35 or 40 may contain advertising indicia of the commercial establishment or some other commercial venture.

As can be further appreciated from the above description, the end caps 35 or 40 may be changed very easily simply by unscrewing the end caps 35 or 40 and screwing on a differently decorated set without the necessity of removing the cross rod 25 or otherwise dissembling or removing the utility rod 5 or base rods 15 from the wall. Moreover, the cover plates 20 may be changed by removing only the cross rod 25 from the assembly 5.

Figure 8:
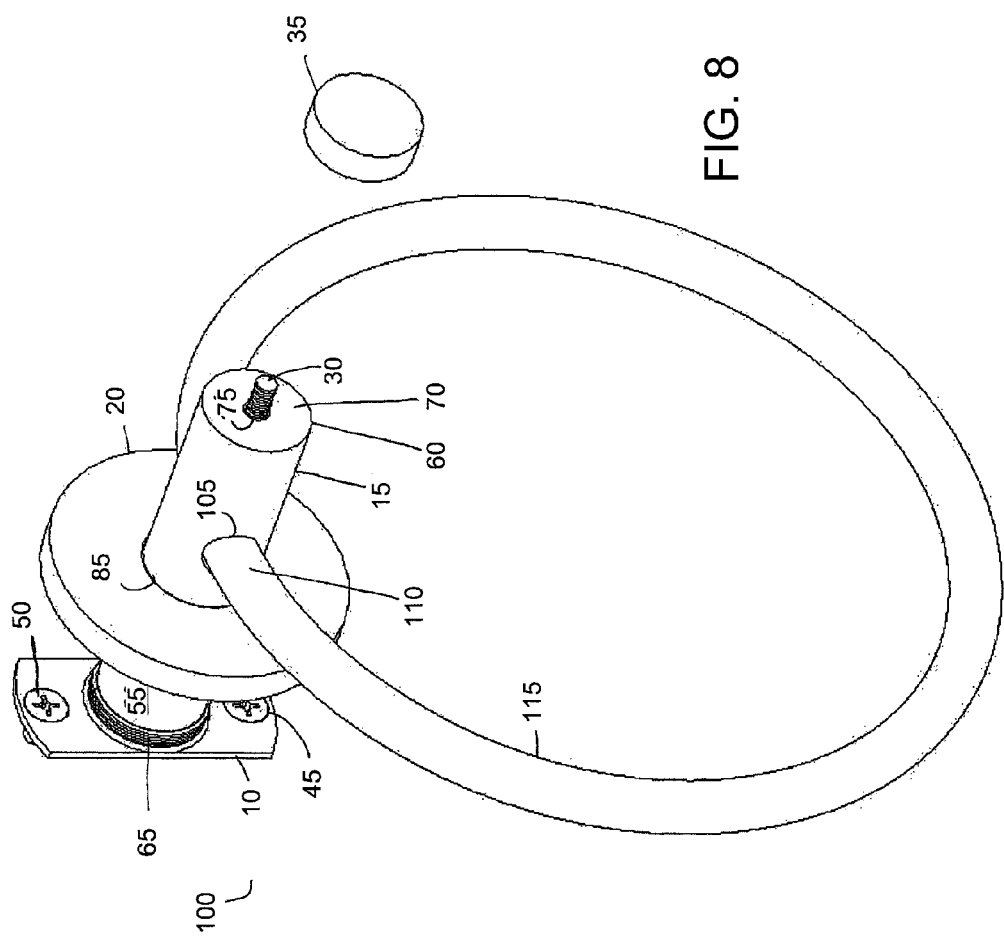
FIG. 8 is a perspective, partially exploded view of a towel ring assembly, another embodiment of the invention.
Figure 9:
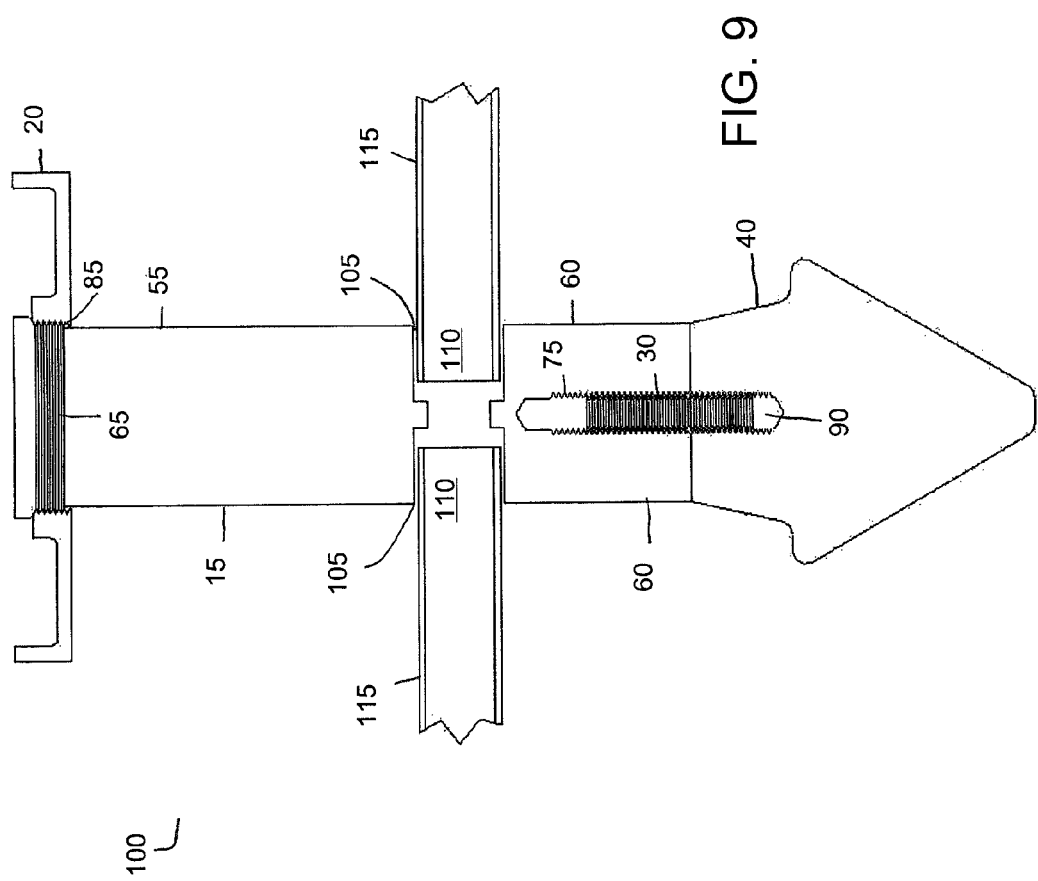
FIG. 9 is a partial, top cross sectional view of the towel ring assembly of FIG. 8.

FIGS. 8 and 9 show another embodiment of the invention, a towel ring assembly 100. The towel ring assembly 100 is similar to the utility rod 5 shown in FIGS. 1 and 2, having a wall attachment plate 10, a base rod 15, a cover plate 20, a set screw 30, and end caps 35 and 40 (See FIGS. 8 and 9, respectively.) The wall attachment plate 10 contains holes 45 through which the base rod 15 may be secured to a wall or stud (not shown) by screws 50. The base rod 15 is incorporated in the attachment plate 10. A proximal end 55 of the base rod 5 is slightly larger in diameter than the distal end 60 of the base rod 15. The proximal end 55 of the base rod 5 is threaded, containing threads 65.

The distal end 60 of the base rod 15 contains a solid end or plug 70, which forms a threaded hole 75. The base rod 5 also contains a side hole 105 on both sides thereof, each of which is sized to receive an end 110 of a towel ring 115. The cover plate 20 forms a central hole 85 that is threaded. The set screw 30 is completely threaded; if desired half of the set screw may be threaded in the reverse direction from the other half. End caps 35 and 40 each form a threaded hole 90 (see FIG. 9). The set screw 30 is screwed about half way into the plug or solid end 70 of the base rod 15, and the knob or end cap 35 or 40 is screwed onto the half of the set screw 30 that remains outside of the plug or solid end 70 of the base rod 15.

As shown in FIGS. 8 and 9, the ends of the towel ring 115 are fit into the holes 105 in the sides of the base rod 5. A towel may be placed in the towel ring 115. The end cap 35 or 40, or another style of end cap, or an end cap made of other materials, may be placed on the end of the base rod 15. As before, the cover plate 20 may be of a different design or made of different materials, as well.

Figure 10:
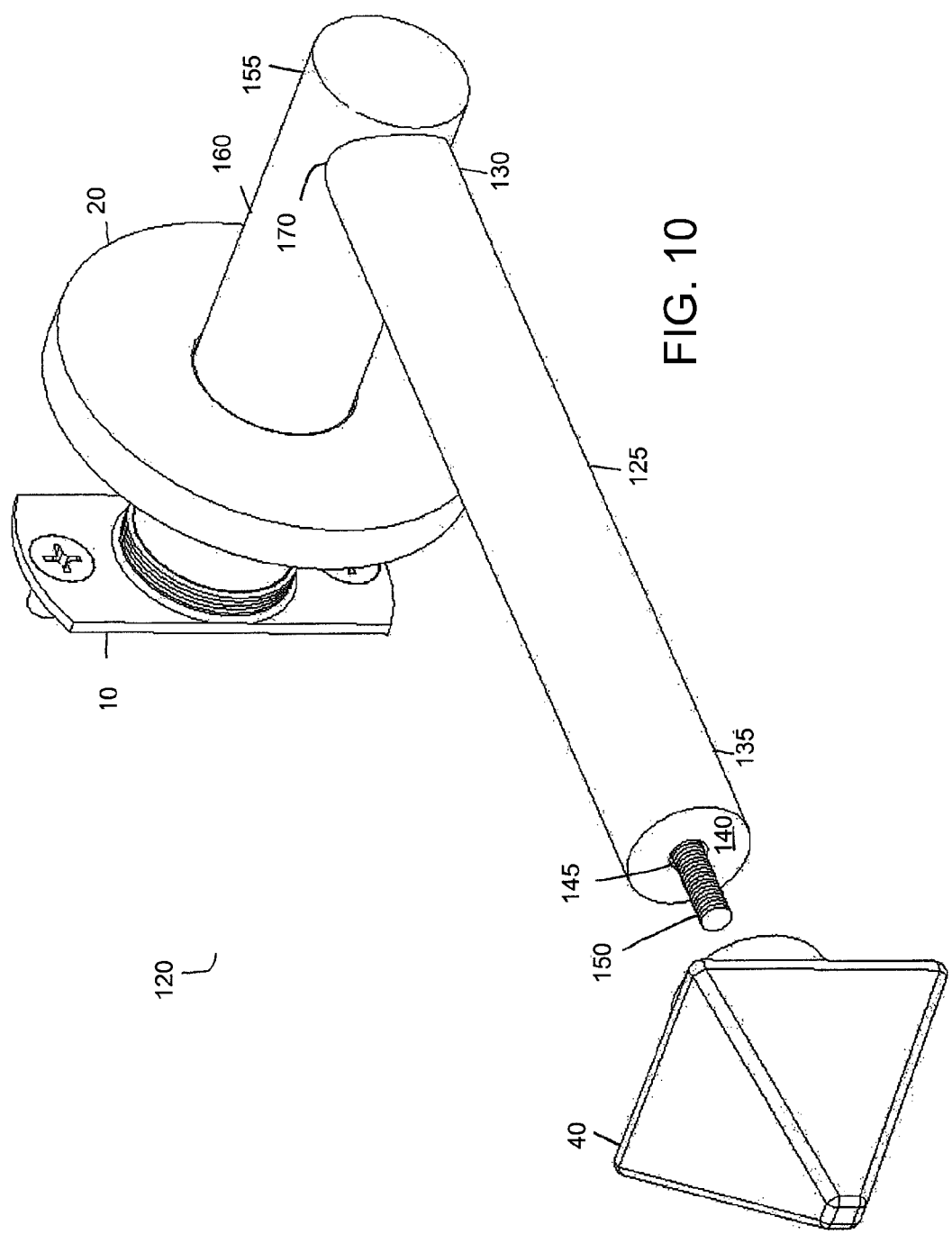
FIG. 10 is a perspective, partially exploded view of a toilet paper holder assembly, another embodiment of the invention.
Figure 11:
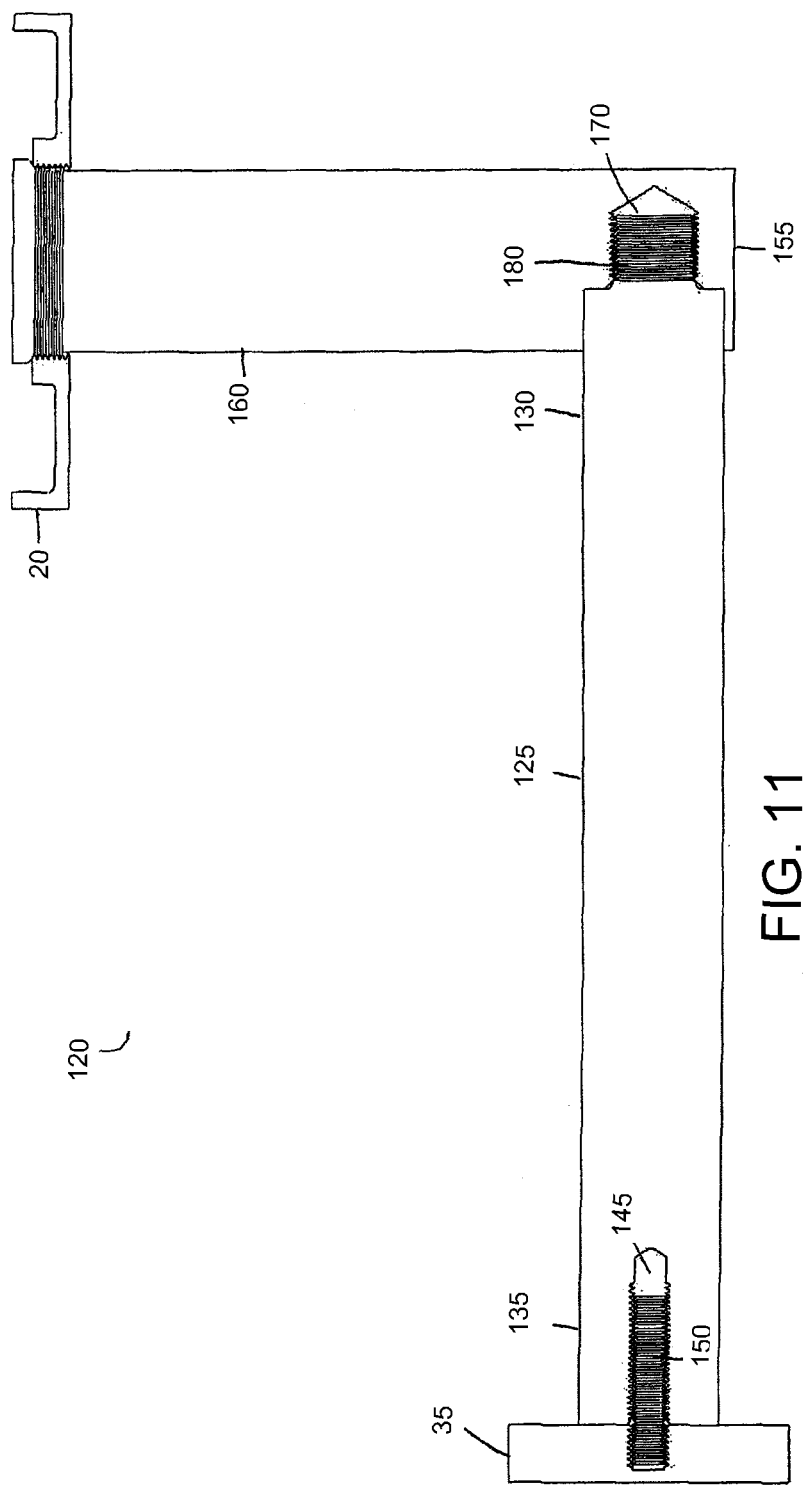
FIG. 11 is a partial, top cross sectional view of the toilet paper holder assembly of FIG. 10.

FIGS. 10 and 11 show another embodiment of the invention, a toilet paper holder assembly 120. The wall attachment plate 10 and cover plate 20 are the same as those shown in FIGS. 1 and 2, with the same parts and attachments. A toilet paper rod 125 has a proximal end 130 and a distal end 135. The distal end 135 has a plug or solid end 140 with a threaded hole 145. The end cap 35 or 40 (see FIGS. 11 and 10, respectively) is secured to the distal end 135 of the toilet paper rod 125 by a threaded set screw 150 that is the same as the set screw 30 shown in FIGS. 1 and 2.

A distal end 155 of a base rod 160 has a threaded hole 170. The proximal end 130 of the toilet paper rod 125 has a threaded insert 180. The threaded insert 180 of the proximal end 130 of the toilet paper rod 125 is screwed into the threaded hole 170 in the base rod 160.

Though not shown in FIGS. 10 and 11, an end cap 35 or 40, or another style of end cap, or an end cap made of other materials, may be screwed on the end of the base rod 160 (similar to the interaction between end cap and rod 60 in FIGS. 1-9). And as before, the cover plate 20 may be of various designs and materials.

Figure 12:
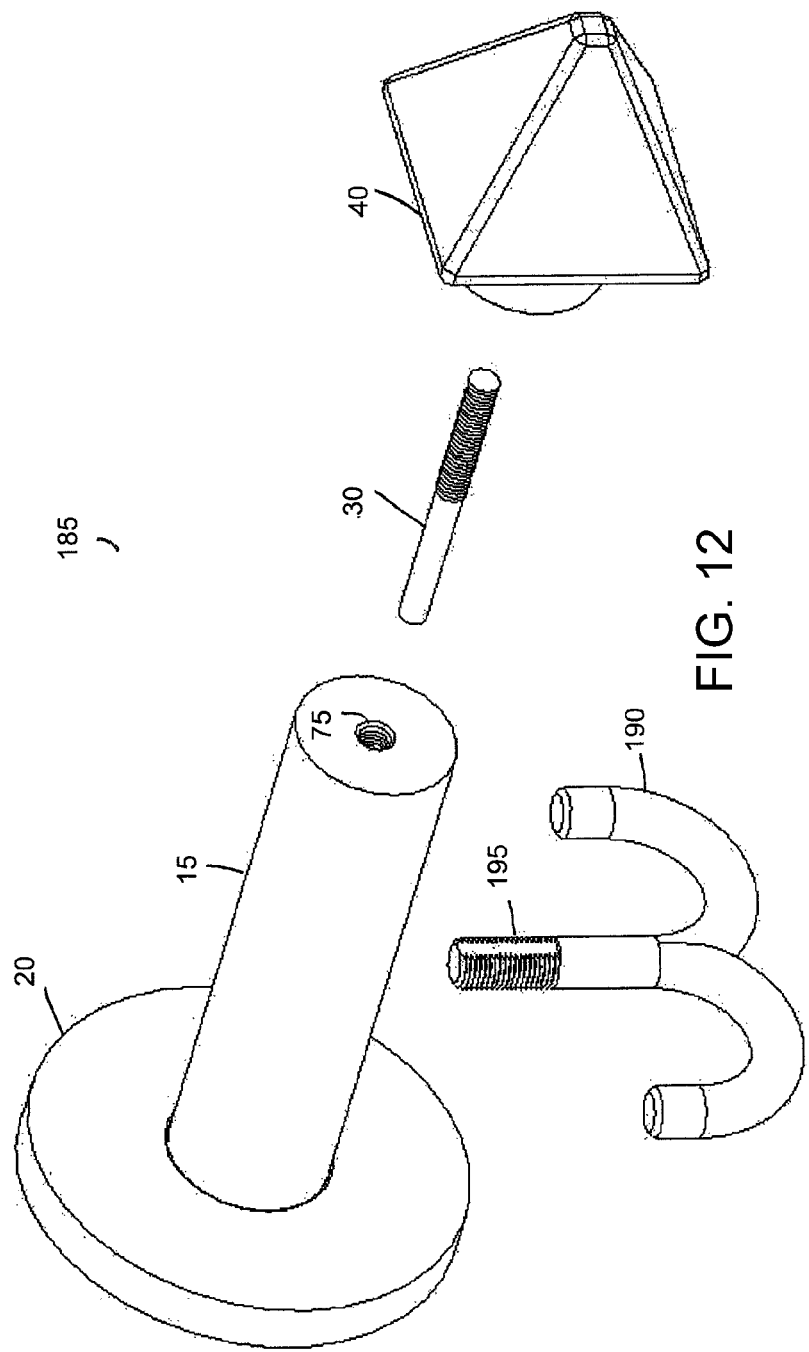
FIG. 12 is a perspective, partially exploded view of a hook assembly, another embodiment of the invention.
Figure 13:
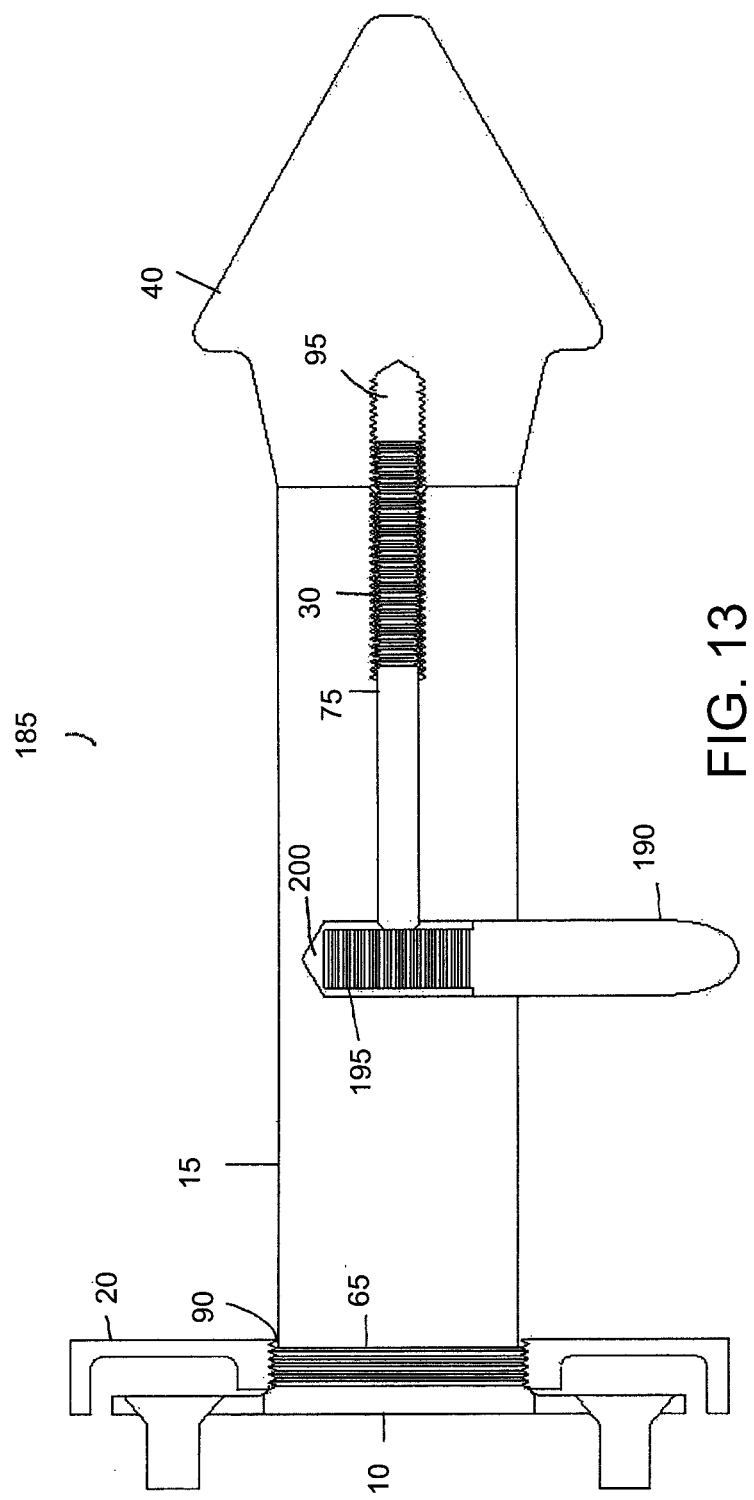
FIG. 13 is a side view of the embodiment of FIG. 12 with a partial cross sectional view of the threaded attachments for an end cap and a hook.

FIGS. 12 and 13 show a hook assembly 185 comprising a wall attachment plate 10, a cover plate 20, a base rod 15, a set screw 30, a knob or end cap 40, and a hook 190. The wall attachment plate 10, cover plate 20, base rod 15, set screw and end cap 40 are constructed and assembled, serve the same purposes, perform the same functions, and have the same decorative features and flexibility as the similar parts described above with respect to the utility rod of FIGS. 1 and 2.

The hook 190 has a threaded post 195 that screws into a hole 200 in the bottom of the base rod 15.

The end cap or knob 40, or another style of end cap, or an end cap made of other materials, may be screwed on the end of the hook assembly 185. The cover plate 20 may also be of a different design or made of different materials.

With minor changes, the utility rod assembly 5 shown in FIGS. 1 and 2 may be reconfigured as shelving with the cover plate 20 covering the wall attachment plate 10 and providing decorating flexibility and with the end caps or knobs 35 or 40 providing further decorating flexibility. As will be readily apparent, the utility rod assembly 5 of FIGS. 1 and 2 may be converted to a shelving design by lengthening the base rods 15, and providing threaded holes in the sides of and along the length of each base rod 15. Multiply cross rods similar to cross rod 25 may then be inserted or screwed into the holes to provide shelving. The flexible, decorative aspects of the cover plate 20 and end caps 35 or 40, or end caps or knobs with other desired shapes or styles or made from other materials, remain. Thus, such shelving serves the decorating styles and desires of the user.

Figure 14:
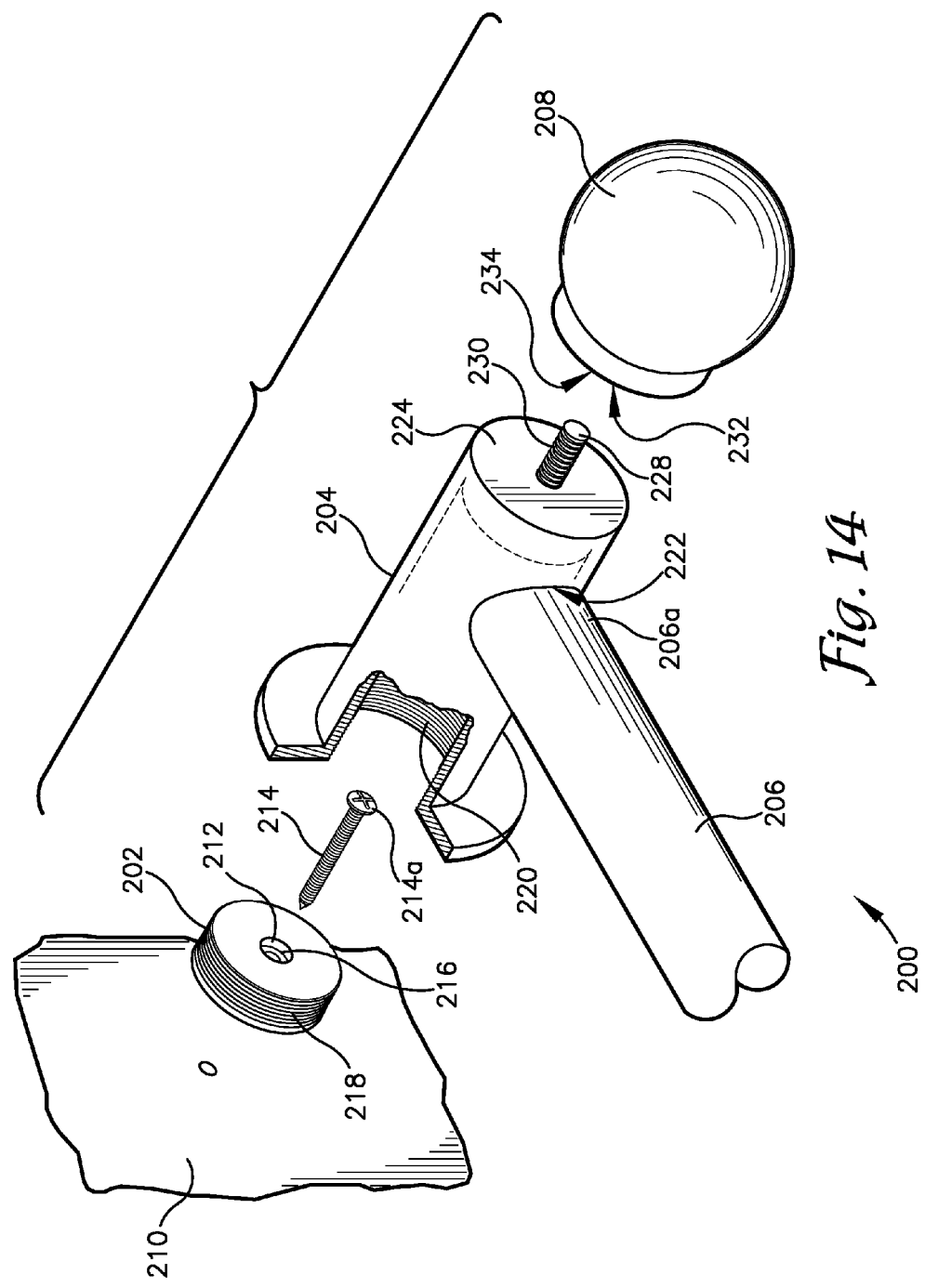
FIG. 14 is a perspective exploded view of another embodiment of a utility rod assembly.

FIG. 14 shows another embodiment of a utility rod assembly 200, which includes a wall attachment member 202, a base rod 204, a cross rod 206, and a knob (or "end cap") 208. While the assembly 200 is described in detail below, it is important to appreciate that the primary distinction between assembly 200 and the embodiments shown in FIGS. 1 through 13 is the structure and method of attachment to a wall. More specifically, the wall attachment plate 10 and complementary structure in any of the preceding embodiments may be replaced by the attachment member 202 and complementary structure.

The wall attachment member 202 has an opening 212 which is configured to receive a screw 214, and via the screw 214, the wall attachment member 202 is secured to a wall 210 or other such surface to which the utility rod assembly 200 is to be secured. The opening 212 may have a stop 216, against which a head 214*a* of the screw 214 abuts. Abutting of the head 214*a* of the screw 214 against the stop 216 prevents the wall attachment member 202 from rotating along with the base rod 204, when the base rod 204 is secured to the wall attachment member 202; more specifically, the wall attachment member 202 may have external threading 218, and the base rod 204 may have internal threading 220 that enables the base rod 204 to be screwed onto the wall attachment member 202. In this way, the wall attachment member 204, which may be unsightly if visible, is generally hidden by the base rod 204.

The base rod 204 has a hole 222 which is configured to receive a proximal end 206*a* of the cross rod 206. It will be appreciated by those skilled in the art that an opposite (distal) end of the cross rod 206 (not shown) correspondingly fits into the opening 222 of a second base rod 204 (not shown).

The base rod 204 has a flat edge 224, which is configured to receive a set screw 228. The set screw 228 is completely threaded with threading 230, and if desired, part of the set screw 228 may be threaded in the reverse direction from the other half. A portion of the set screw 228 is screwed into the flat edge 224 of the base rod 204, while a portion of the set screw 228, as shown in FIG. 14, protrudes from the flat edge 224.

While not directly shown in FIG. 14, the end cap 208 has an opening 232, which includes internal threading 234 that is configured to receive the set screw 228. By virtue of the set screw 228, the end cap 208 can be easily screwed onto the base rod 204. As will be appreciated, the end cap 208 is not limited to the round shape shown in FIG. 14. Indeed, the end cap 208 may be made of any shape that permits a threaded central opening 232 to be placed therein. Thus, the end cap 208 may be made in such varied shapes as footballs, flowers, initials, Thanksgiving turkeys, and cartoon characters, for example. Alternatively, the end cap 208 may be circular or rectangular and contain painted or raised scenes or decorations, for example.

It will further be appreciated that neither the base rod 204, nor the end cap 208 need be made of the same material as the other parts of the utility rod assembly 200. Rather, the base rod 204 or the end cap 208 may be made of any material into which a threaded opening (e.g., opening 232) may be formed. Thus, the end caps 208 and connecting members 204 may be made of metal, wood, plastic, stone, or other substances which add to the theme, vanity, décor, or style desired by the user. The end caps 208 and connecting members 204 may also be made of a material such as metal or wood with a veneer of another material that may be painted or otherwise formed or decorated by the user.

Further, the end caps 208 and base rod 204 may present a shape or surface configuration that is round, oval, square, octagonal, rectangular, triangular, octagonal, pentagonal, quadrilateral, any combination of the forgoing, or any other shape that permits a threaded hole to be formed therein.

The utility rod assembly 200 thus has maximum flexibility to suit the tastes of the users, allowing for different themes, styles, artwork, or seasonal expressions. For instance, in commercial establishments, the base rod 204 and end cap 208 may contain advertising indicia of the commercial establishment or some other commercial venture.

As can be further appreciated from the above description, the end caps 208 may be changed very easily simply by unscrewing the end caps 208 and screwing on a differently decorated set without the necessity of removing the cross rod 206 or otherwise disassembling or removing the base rod 204 or wall attachment 202 from the wall 210.

Figure 15:
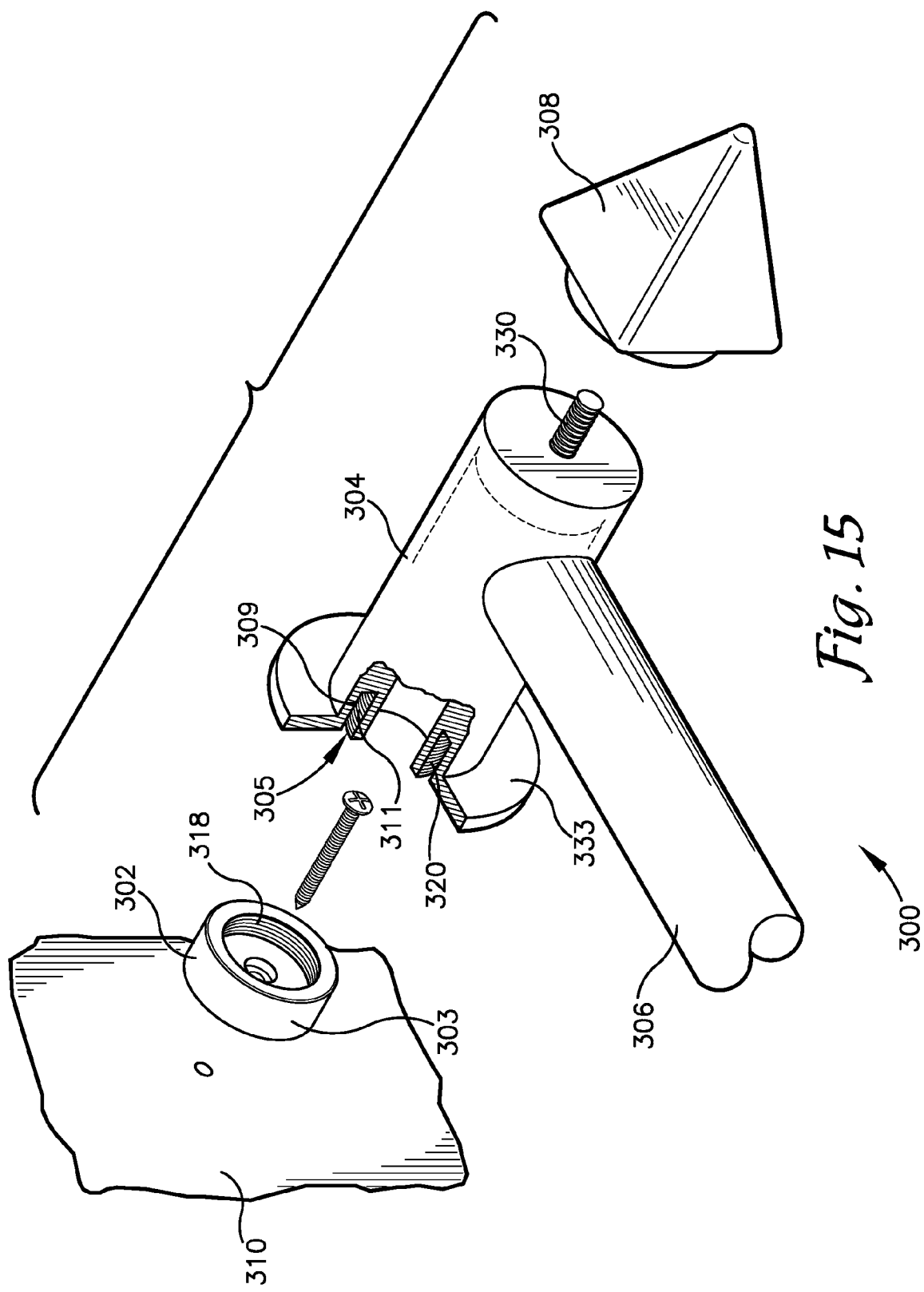
FIG. 15 is a perspective exploded view of yet another embodiment of a utility rod assembly.

An alternate embodiment 300 of a utility rod assembly is shown in FIG. 15, which is generally similar to embodiment 200 described above, except as specifically noted and/or shown, or as would be inherent. The embodiment 300 includes a wall attachment member 302, a base rod 304, a cross rod 306, and a knob or end cap 308. The primary difference between embodiments 200 and 300 pertains to threading 218, 318 in the wall attachment members 202, 302, and corresponding threading 220, 320 in the base rods 204, 304. More specifically, while the wall attachment member 202 of embodiment 200 has external threading 218 which is configured to allow the base rod 204 to be secured thereto via the internal threading 218 of the base rod 204, in embodiment 300, the wall attachment member 302 has internal threading 318, via which the base rod 304 is secured to the wall attachment member 302.

As shown in FIG. 15, the base rod 304 has an outer cylindrical portion 309 and an inner cylindrical portion 311 which is enclosed within the outer cylindrical portion 309. A cylindrical gap 305 is formed between the outer and inner cylindrical portions 309, 311. This gap 305 is configured to receive an outer surface 303 of the wall attachment member 302. Once gap 305 is placed adjacent the outer surface 303 of the wall attachment member 302, the base rod 304 is rotated (clockwise or counter clockwise as desired) to allow for the threading 320 in the base rod 304 to match with threading 318 in the wall attachment member 302, thereby causing the outer surface 303 of the wall attachment member 302 to be fully or at least partially enclosed within the gap 305, and for the securing of the base rod 304 to the wall attachment member 302.

While the end cap 308 as shown in FIG. 15 differs in shape from the end cap 208 of FIG. 14, it will be appreciated that the end cap 308 is secured to the base rod 304 via a set screw 330 in the same manner as the end cap 208 is secured to the base rod 204 via the set screw 230. It will also be appreciated that the end cap 308 generally possesses similar qualities and flexibility as end cap 208, for example, end cap 308 is easily removable and replaceable, may have indicia present on it, and may be made of a different material than the rest of the parts of the utility rod assembly 300.

As shown in FIG. 15, the base rod 304 has a covering portion 333. The covering portion 333 may also have indicia present on it, and may comprise one or more colors. When the base rod 304 is properly secured to the wall attachment member 302, the covering portion 333 becomes adjacent wall 310 or other such surface to which the utility rod assembly 300 is secured to. The covering portion 333 provides an additional avenue for decoration and or advertisement etc. As shown, the covering portion 333 may be of unitary construction with the base rod 304, however, it will be appreciated that the covering portion 333 may also be secured to the base rod 304 via other known methods, for example, via corresponding threading on the base rod 304 and the covering portion 333.

Figure 16:
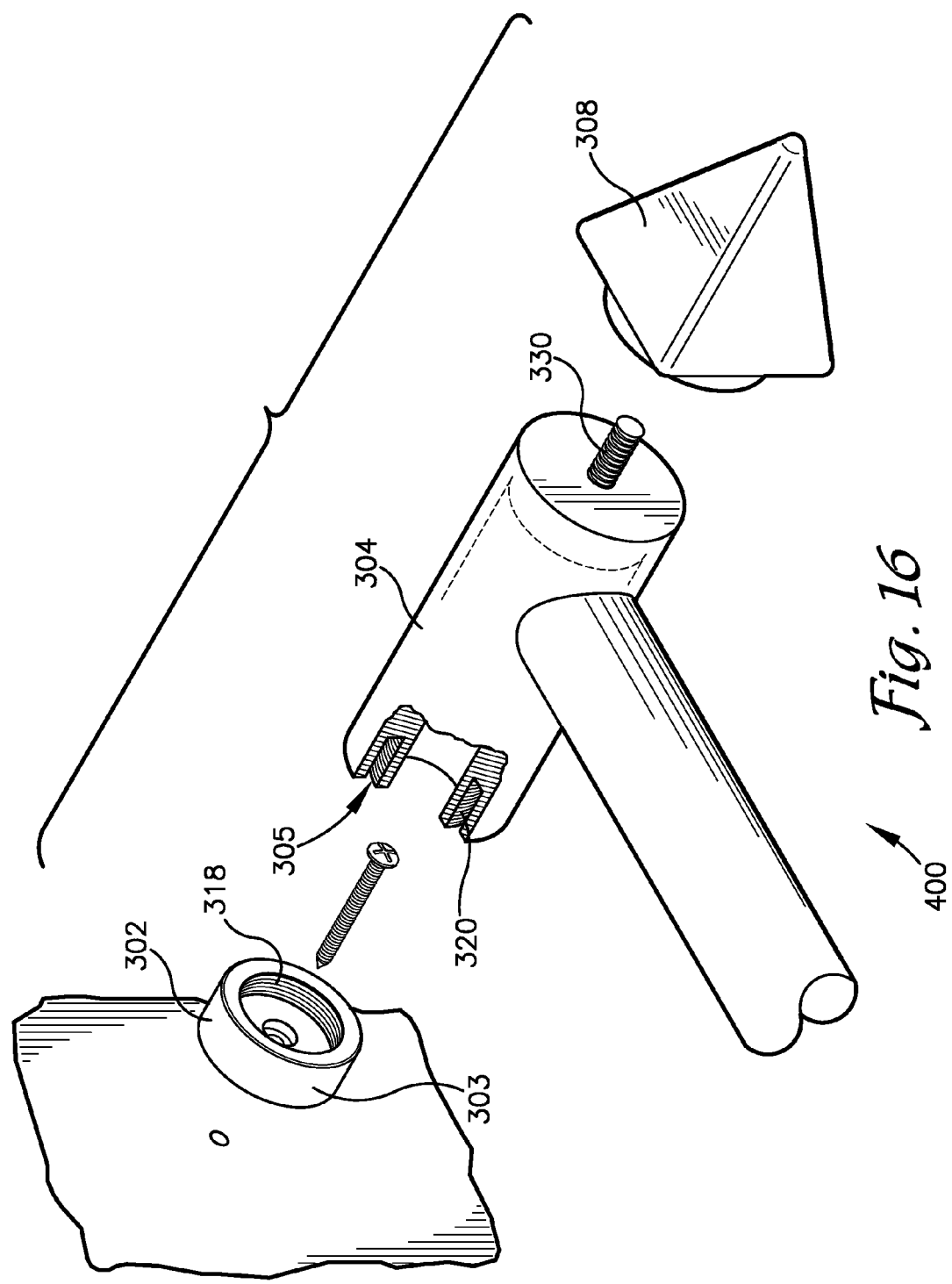
FIG. 16 is a perspective exploded view of yet another embodiment of a utility rod assembly.

An alternate embodiment 400 of a utility rod assembly is shown in FIG. 16, which is generally similar to embodiment 300 described above, except as specifically noted and/or shown, or as would be inherent. For uniformity and brevity, corresponding reference numbers may be used to indicate corresponding parts in FIGS. 15 and 16, though with any noted deviations. The primary difference between the embodiments 300 and 400 pertains to the covering portion 333 of the base rod 304; the covering portion 333 is absent from embodiment 400. The absence of the covering portion 333 may allow for cheaper construction of the utility rod assembly 400, as compared to the utility rod assembly 300. While the end cap 308 of FIG. 16 is the same as the end cap 308 of FIG. 15, it will be appreciated that either embodiment may have an end cap 308 that is shaped differently, so long as such shape allows for a threaded hole to conform and be secured to set screw 330.

Figure 17:
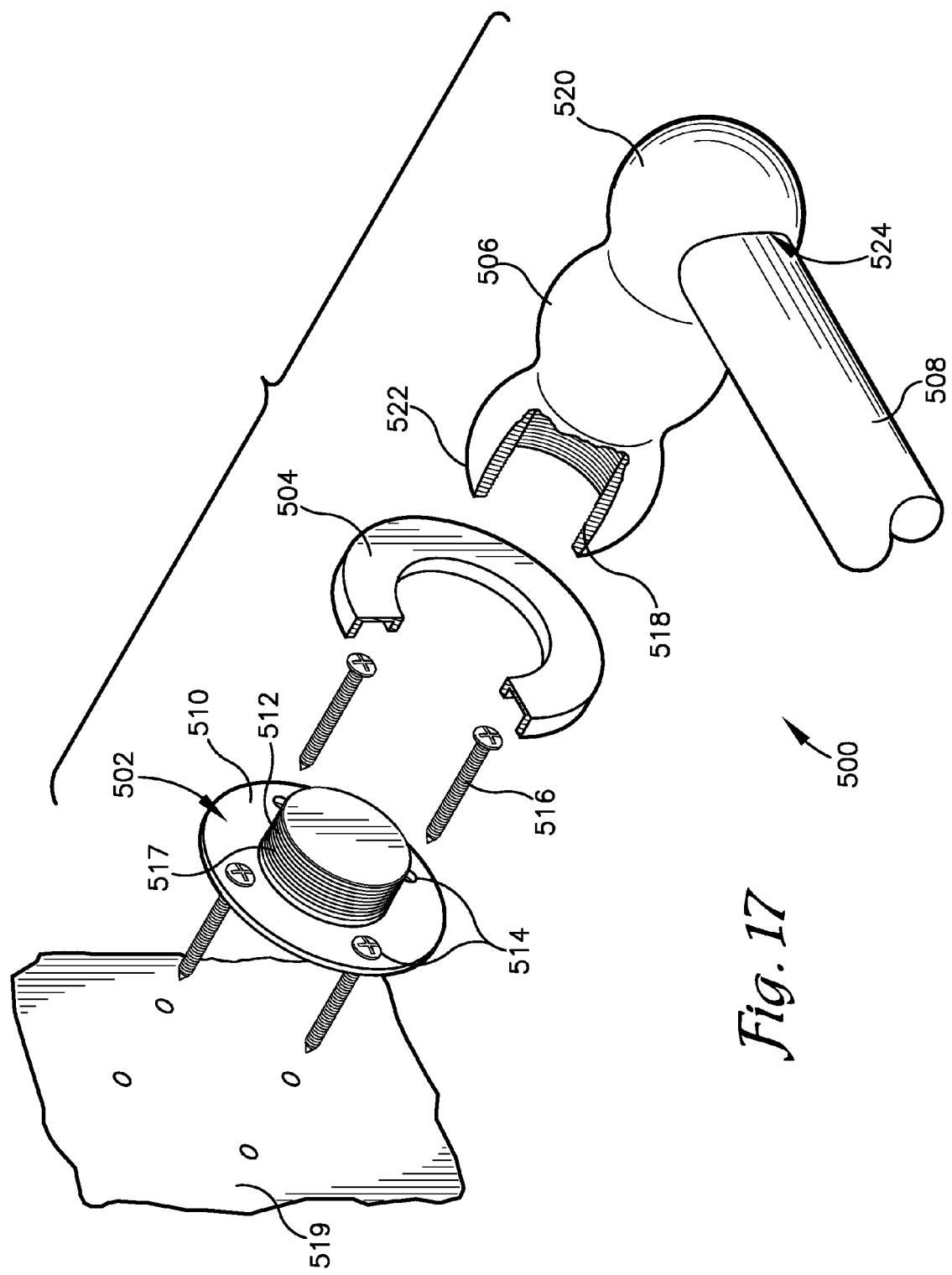
FIG. 17 is a perspective exploded view of another embodiment of a utility rod assembly.

FIG. 17 shows another embodiment 500 of a utility rod assembly that includes a wall attachment member 502, a wall attachment cover 504, a base rod 506, and a cross rod 508. While the assembly 500 is described in detail below, it is important to appreciate that the primary distinction between assembly 500 and the embodiments shown in FIGS. 1 through 13 is the structure and method of attachment to a wall. More specifically, the wall attachment plate 10 and complementary structure in any of those preceding embodiments may be replaced by the attachment member 502 and complementary structure.

The wall attachment member 502 has a connecting portion 510 and a protruding threaded portion 512. The connecting portion 510 may have openings 514 through which screws 516 can be passed through. The wall attachment member is secured to a wall 519 or other such surface via the screws 516. The number of openings 514 and screws 516 may vary.

Once the wall attachment member 502 is secured to the wall 519, the wall attachment cover 504 is placed on the connecting portion 510. As will be appreciated, the wall attachment cover 504 may include indicia and/or different colors, and hides the unsightly screws 514 and the connecting portion 510 from view.

The protruding threaded portion 512 of the wall attachment member 502 has external threading 517, which is configured to receive internal threading 518 of the base rod 506. As will be appreciated, the base rod 506 in FIG. 17 is different than the connecting members shown in FIGS. 14-16, in part because the base rod 506 has a unitarily connected end piece 520, i.e., a removable end cap is not shown secured to the base rod 506. Of course, however, the base rod 506 may be manufactured such that it has a set screw for securing an easily removable end piece thereon.

As the base rod 506 is secured to the wall attachment member 502 via the respective threading 518, 517, an end 522 of the base rod 506 may push against and generally prevent movement of the wall attachment cover 504 (which may or may not be threaded).

The base rod 506 has an opening 524, which, much like the embodiments shown in FIGS. 14-16 for example, is configured to receive a cross rod 508. It will be appreciated by those skilled in the art that the cross rod 508 and the remaining elements of the embodiment 500 need not be of the same material, color, or texture etc. It will further be appreciated that the base rod 506 (and the wall attachment cover 504) may include various indicia or other thematic or ornamental designs, and that a user may easily unscrew the base rod 506 and remove the wall attachment cover 504, and replace it with a wall attachment cover 504 and base rod 506 that is of a different color, or theme etc. Additionally, the base rod 506 and/or the wall attachment cover 504 need not appear as shown in FIG. 17, but may be of a different shape; for example, the base rod 506 may be generally cylindrical.

FIG. 18 shows yet another embodiment 600 of the utility rod assembly, which is generally similar to embodiment 200 of FIG. 14, except as specifically noted and/or shown, or would otherwise be inherent. As shown, the utility rod assembly 600 includes a wall attachment member 602, a base rod 604, and a cross rod 620. The primary difference between assembly 600 and assembly 200 is that the assembly 600 has a unitarily connected end piece instead of a removable end cap.

The wall attachment member 602, akin to the wall attachment member 202 of embodiment 200, has external threading 606, and an opening 608 generally at its center. Within the opening 608 is a stop 609, against which a head 612 of a screw 610 abuts against; more specifically, the screw 610 is passed through the opening 608 to secure the wall attachment member 602 to a wall 614 or other such surface. Abutting of the head 612 of the screw 610 against the stop 609 prevents the wall attachment member 602 from rotating along with the base rod 604, when the base rod 604 is being secured to the wall attachment member 602. As shown in FIG. 18, the base rod 604 has a connecting portion 616 that has internal threading 618, which correspond to and allow for the base rod 604 to be screwed onto the threading 606 of the wall attachment member 602.

The base rod 604 has an opening 617 which is configured to hold a proximal end 622 of a cross rod 620, and as will be appreciated, a corresponding wall attachment member 602 and base rod 604 are present and secure a distal end (not shown) of the cross rod 620. Similar to other embodiments, the shape of the base rod 604 need not be as shown in FIG. 18, but could be any shape that can accommodate internal threading 618 that correspond to the external threading 606 of the wall attachment member 602. Also, the base rod 604, which hides the wall attachment member 602 from view, may have different indicia, and may be of different colors. For example, in commercial establishments, the connecting member may be of colors that are representative of that particular commercial establishment, and may include writing or other advertising indicia as desirable.

Many different arrangements of the various components depicted, as well as components not shown, are possible without departing from the spirit and scope of the present invention. For example, as with utility rod 5 shown in FIGS. 1 and 2, the utility rod assemblies 200, 300, 400, 500, and 600 shown in FIGS. 14-18 respectively may be converted to a shelving design by increasing the length of the respective attachment members, and/or by increasing the number of openings in said attachment members for the placement of additional cross rods. Of course, the flexible, decorative aspects of the various embodiments would remain regardless of whether the respective utility rods are being used as shelving, towel rods, or for other desirable purposes.

Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

What is claimed is as follows:

1. A customizable utility rod assembly, comprising:
   a wall attachment member comprising:
      an outer surface having an outer diameter and an inner surface having an inner diameter, the inner surface having threading; and
      at least one hole configured to receive a fastener for securing the wall attachment member to a surface;
   a base rod having a proximal side and a distal side extending outwardly therefrom; and
   an element extending from the base rod, the element selected from the group consisting of a cross rod, a hook, a towel ring, a shelving rod, and a toilet paper rod;
   wherein the base rod proximal side comprises an outer cylindrical portion and an inner cylindrical portion forming a cylindrical gap therebetween, wherein the cylindrical gap has an outer surface and a threaded inner surface; and
   wherein the diameter of the outer surface of the wall attachment member is substantially equal to a diameter of the outer surface of the cylindrical gap and the diameter of the inner surface of the wall attachment member is substantially equal to a diameter of the threaded inner surface of the cylindrical gap such that the wall attachment member is received into the cylindrical gap, the respective threaded inner surface of the wall attachment portion and the cylindrical gap threadably coupling the base rod to the wall attachment member.

2. The customizable utility rod assembly of claim 1, wherein a covering portion extends from the outer cylindrical portion.

3. The customizable utility rod assembly of claim 2, wherein the wall attachment member has a stop within the hole for interacting with the fastener to prevent the wall attachment member from rotating along with the base rod, when the base rod is being threadably coupled to the wall attachment member.

4. The customizable utility rod assembly of claim 1, wherein the base rod distal side has an opening for receiving a threaded set screw.

5. The customizable utility rod assembly of claim 4, further comprising an end cap having internal threading configured for threadably coupling the end cap to the base rod distal side via the set screw.

6. The customizable utility rod assembly of claim 5, wherein at least one of the base rod and the end cap has indicia.

* * * * *